(12) United States Patent
Belanger et al.

(10) Patent No.: US 8,576,853 B2
(45) Date of Patent: *Nov. 5, 2013

(54) TWO-LAYER SWITCH APPARATUS AVOIDING FIRST LAYER INTER-SWITCH TRAFFIC IN STEERING PACKETS THROUGH THE APPARATUS

(75) Inventors: Matthew T. Belanger, Holly Springs, NC (US); Gary R Shippy, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/526,616

(22) Filed: Jun. 19, 2012

(65) Prior Publication Data
US 2012/0263187 A1     Oct. 18, 2012

Related U.S. Application Data

(63) Continuation of application No. 12/481,678, filed on Jun. 10, 2009, now Pat. No. 8,289,977.

(51) Int. Cl.
*H04L 12/28* (2006.01)
(52) U.S. Cl.
USPC ............................ 370/396; 370/254; 709/223
(58) Field of Classification Search
None
See application file for complete search history.

(56) References Cited

U.S. PATENT DOCUMENTS

| 5,982,869 | A | 11/1999 | Lozano et al. |
| 6,950,394 | B1 | 9/2005 | Chou et al. |
| 7,107,352 | B2 | 9/2006 | Tuck, III et al. |
| 7,142,564 | B1 | 11/2006 | Parruck et al. |
| 7,397,768 | B1 * | 7/2008 | Betker .......................... 370/254 |
| 7,697,525 | B2 | 4/2010 | Zelig et al. |
| 2003/0099194 | A1 | 5/2003 | Lee et al. |
| 2005/0265248 | A1 | 12/2005 | Gallatin et al. |
| 2006/0114899 | A1 | 6/2006 | Toumura et al. |

(Continued)

FOREIGN PATENT DOCUMENTS

WO    WO 03/103237 A1    12/2003

OTHER PUBLICATIONS

PCT Search Report, May 10, 2010; PCT Application No. PCT/EP2010/052749.

(Continued)

*Primary Examiner* — Nicholas Sloms
(74) *Attorney, Agent, or Firm* — Edward J. Lenart; Cynthia G. Seal; Biggers & Ohanian, LLP.

(57) ABSTRACT

Link-level data communications implemented in switching apparatus comprising modular switches disposed within a modular computer cabinet that includes modular computer systems; the switching apparatus configured as two layers of switches, the first layer switches coupled to one another for communications by inter-switch links, each second layer switch coupled for communications to the modular computer systems; all the switches stacked by a stacking protocol that shares administrative configuration information among the switches through the inter-switch links and presents all the switches as a single logical switch; the switching apparatus including ports coupling the apparatus to networks and to service applications and terminating applications on the modular computer systems; and sending the packet from network to modular computer system to which the packet is directed, or from modular computer system to network to which the packet is directed, the packet traversing none of the inter-switch links among the first layer switches.

15 Claims, 5 Drawing Sheets

(56) References Cited

U.S. PATENT DOCUMENTS

| | | |
|---|---|---|
| 2006/0133280 A1 | 6/2006 | Natchu |
| 2007/0086455 A1 | 4/2007 | Allan et al. |
| 2007/0248086 A1 | 10/2007 | Petersen |
| 2007/0258447 A1 | 11/2007 | Raszuk et al. |
| 2007/0288615 A1 | 12/2007 | Keohane et al. |
| 2008/0049621 A1 | 2/2008 | McGuire et al. |
| 2008/0159138 A1 | 7/2008 | Shepherd et al. |
| 2008/0216074 A1 | 9/2008 | Hass et al. |
| 2009/0003317 A1 | 1/2009 | Kasralikar et al. |
| 2010/0246593 A1 | 9/2010 | Belanger et al. |
| 2010/0290475 A1 | 11/2010 | Belanger et al. |
| 2010/0303083 A1 | 12/2010 | Belanger et al. |
| 2010/0316055 A1 | 12/2010 | Belanger et al. |

OTHER PUBLICATIONS

Bayle, et al.; "Performance Measurements of MPLS Traffic Engineering and QoS", Worcester Polytechnic Institute online (wpi.edu), accessed Jun. 18, 2012, 55 pp., URL: web.cs.wpi.edu/~rek/Adv_Nets/Spring2002/MPLS_TE.pdf.

Enterprise Ethernet Solutions—High Function Switch Router, Broadcom Xelerated Partner Brief, May 2004, XXF-Brief:052, Xelerated and Broadcom, US.

Office Action, U.S. Appl. No. 12/467,367, Dec. 21, 2010, 24 pp.

Notice of Allowance, U.S. Appl. No. 12/410,803, Sep. 20, 2010, 17 pp.

Office Action, U.S. Appl. No. 12/472,987, Jul. 18, 2011, 22 pp.

* cited by examiner though the switches. Either way there is an affin-
TWO-LAYER SWITCH APPARATUS AVOIDING FIRST LAYER INTER-SWITCH TRAFFIC IN STEERING PACKETS THROUGH THE APPARATUS

CROSS-REFERENCE TO RELATED APPLICATION

This application is a continuation application of and claims priority from U.S. patent application Ser. No. 12/481,678, filed on Jun. 10, 2009.

BACKGROUND OF THE INVENTION

1. Field of the Invention

The field of the invention is data processing, or, more specifically, methods, apparatus, and products for link-level data communications.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer architectures have evolved to take advantage of the higher performance of the hardware, resulting in computer systems today that are much more powerful than just a few years ago.

In a modular computer chassis multiple modular computer systems are connected to one or more switches for their network connectivity. Typically in these systems, each application network port of a modular computer system connects to a modular switch. Multiple application ports from a single modular computer system generally each connect to separate modular switches. Generally these individual switches each connect to different sets of networks. However, NIC teaming may be used where two of the switches connect to the same network and thus the associated two application ports functioning in a NIC teaming mode are connected to the same network through these switches. Either way there is an affinity between each application port and the network(s) to which its corresponding switch is connected. This rigid affinity limits the connectivity of application ports and can restrict the bandwidth between an application port and the networks to which it is connected via its connected switch.

Prior art has attempted to solve this problem by switch stacking With switch stacking Inter-Switch Links (ISL) are used between all these switches along with stacking protocols creating a single logical switch between the connected application ports and connected networks on this stacked switch. The ISL links carry both stacking protocols, which create the single switch image, and data from (to) an application ports to (from) networks. This data traffic across the ISL links is caused by application port data traffic to (from) a network which is not connected to the same switch as the application port. Although this structure solves the connectivity between application ports and networks, it can generate substantial ISL traffic to the point that the ISL links become a bandwidth bottleneck. Additionally, the stacked switch may support Link Aggregation Groups (LAG) across the individual switches to a network. With more than two links in the LAG, a better bandwidth and reliability model is created. However this does not resolve the traffic demand on the ISL links. Additionally, there is even more bandwidth demand on these ISL links in various failure conditions.

Further, one of the areas that has seen substantial improvement is data communications through packet switching. Today many systems provide processing of data communications packets that is transparent to the operations of the source computer, the sender, and the destination of the packets. That is, neither the source nor the ultimate destination of the packets is ever made aware that such transparent processing occurs. Such transparent processing may include for example security processing, load balancing functions among data communications equipment, statistical surveys, and so on. Such transparent processing can include processing by not just one, but several interim service applications, one providing security services, another performing statistical surveys, another performing load balancing, and so on. In a modular system, it is desirable to perform this transparent processing between the connected networks and terminating applications on the modular computer systems.

When data packets are to be processed by several service applications the problem of routing the data stream from one service application to another naturally arises. For service applications that carry out packet analysis and therefore operate in 'bump-in-the-wire promiscuous mode,' that is, transparently and invisibly sitting between devices on networks and terminating applications listening to all packets exchanged between the devices, preserving the packet headers is required. Because such service applications commonly perform inspection on the packet headers and the payload, the entire packet—payload+headers—must be considered "payload" to this kind of service application. Each such bump-in-the-wire service application must return each packet it handles to the communications system with the original header addresses intact so as not to interfere with the overall transmission of the packet from its original source to its ultimate destination.

Prior art has attempted to solve this problem by encapsulating the entire packet—payload+headers—and wrapping it with a new header that specifies the routing of the packet to bump-in-the-wire applications. This new encapsulation header must be understood by all the various hardware, switches, NICs, and so on, and potentially even by the bump-in-the-wire service applications themselves. This requirement to process this additional layer of headers is a burden to hardware developers and application providers who must now design, develop, test, and support an additional configuration of their core product. In addition, some solutions require that application providers not only integrate new header processing, but also port their application to specific hardware and operating system platforms.

Another solution attempted in prior art was to modify packets in certain ways, such as changing the destination MAC address, for example. This option changes the packet and limits the ability to perform the types of analysis that rely on possession of the original addresses in the packet. Moreover, this solution requires hardware developers to provide additional modifications of routers, bridges, and switches that use it to track the original addresses and return them to the packets upon return from the bump-in-the-wire service applications.

SUMMARY OF THE INVENTION

Methods, apparatus, and products are disclosed link-level data communications. Link-level data communications are carried out in a link-level data communications switching apparatus that includes modular link-level data communications switches disposed within a modular computer cabinet. The modular computer cabinet also has disposed within it a plurality of modular computer systems. The switching apparatus is configured as two layers of link-level data communications switches, a first layer and a second layer. The first layer switches are coupled for data communications to data communications networks. The first layer switches are also coupled to one another for link-level data communications by inter-switch links. Each first layer switch is also coupled for link-level data communications to each of the second layer switches. Each second layer switch is coupled for link-level data communications to at least one of the modular computer systems so that each second layer switch provides data communications connections to the switching apparatus only for service applications in the modular computer system to which a second layer switch is coupled. All of the switches that are stacked by a stacking protocol share administrative configuration information among the switches through the inter-switch links and presents all the switches in the switching apparatus to the networks and to the modular computer systems as a single logical switch.

The switching apparatus also includes a plurality of data communications ports. At least one of the ports couple the switching apparatus to at least one data communications network. At least one additional port is connected to a terminal application on at least one of the modular computer systems. Each application is associated with a unique, link-level identifier.

Link-level data communications include receiving, in the switching apparatus through an ingress port from a source network, a data communications packet directed to a modular computer system. Each packet includes a destination network address that identifies a destination of the packet among the modular computer systems. Link-level data communications also include sending the data communications packets to the modular computer system to which the packets are directed, the packets traversing none of the inter-switch links among the first layer switches.

Link-level data communications also include receiving, in the switching apparatus through an ingress port from a modular computer system, a data packet directed to network or another modular computer system. Each packet includes a destination address that identifies a destination of the packet to a network or among the modular computer systems. Link-level data communications also include sending the data communications packets to the network or modular computer system to which the packets are directed, the packets traversing none of the inter-switch links among the first layer switches.

The switching apparatus may optionally also include a plurality of additional data communication ports. At least one of these ports is connected to at least one service application on at least one of the modular computer systems that carry out transparent, bump-in-the-wire data processing of data communication packets traveling between a network and an application on a modular computer system. Each application is associated with a unique, link-level identifier.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
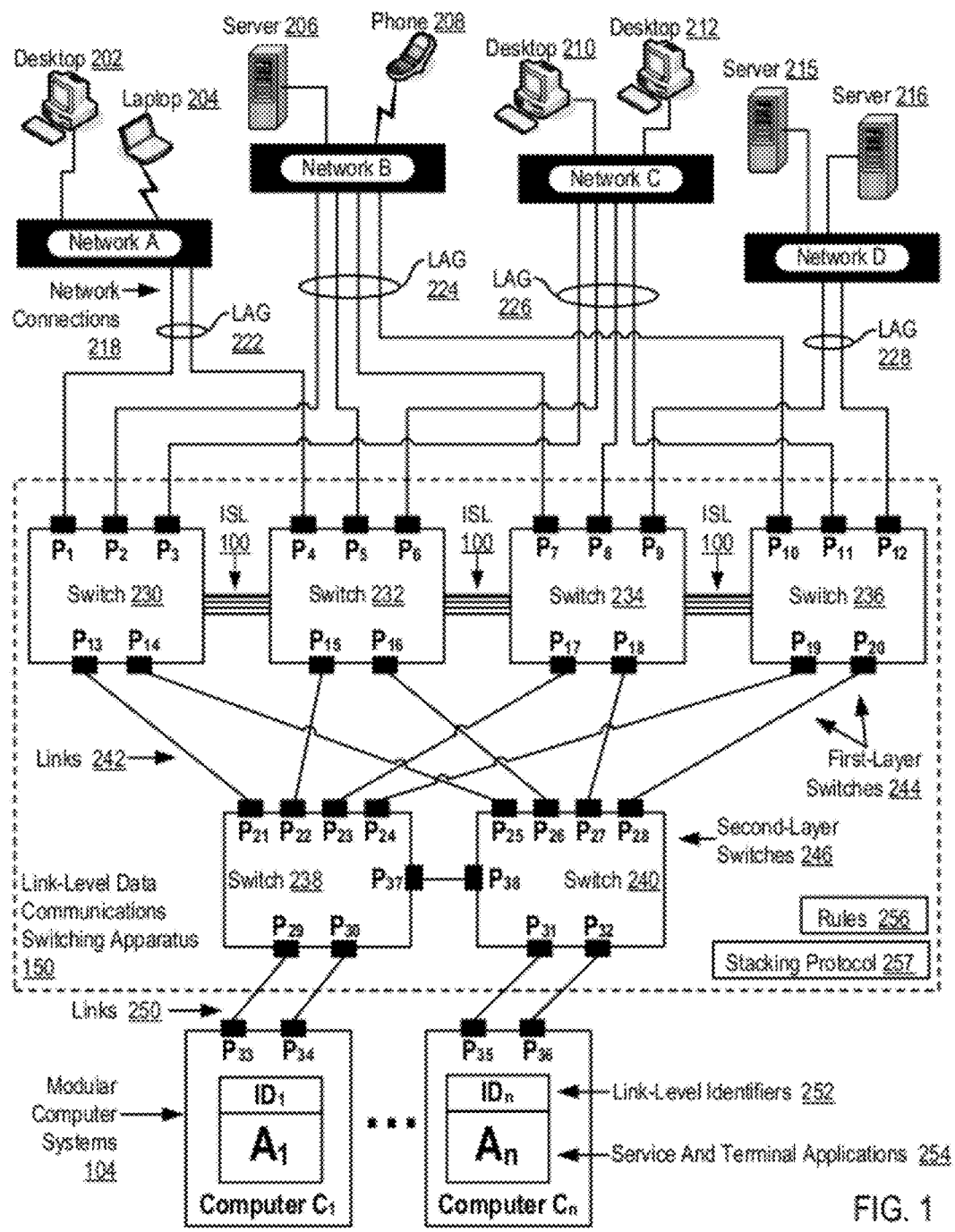
FIG. 1 sets forth a functional block diagram of automated computing machinery, example automated apparatus for link-level data communications according to embodiments of the present invention.

Example methods, apparatus, and products for link-level data communications in accordance with the present invention are described with reference to the accompanying drawings, beginning with FIG. 1. FIG. 1 sets forth a functional block diagram of automated computing machinery, example automated apparatus for link-level data communications according to embodiments of the present invention. The apparatus of FIG. 1 includes a link-level data communications switching apparatus (150) that includes modular link-level data communications switches (230, 232, 234, 236, 238, 240). The modular link-level data communications switches (230, 232, 234, 236, 238, 240) of FIG. 1 are disposed within a modular computer cabinet (102 on FIG. 1A) that also includes a plurality of modular computer systems (104) disposed within the modular computer cabinet. A modular computer cabinet is a frame or enclosure for mounting multiple computing devices. A modular computer cabinet may be embodied, for example, as a blade enclosure, a rack-mount chassis, and in other ways as will occur to those of skill in the art.

Figure 1A:
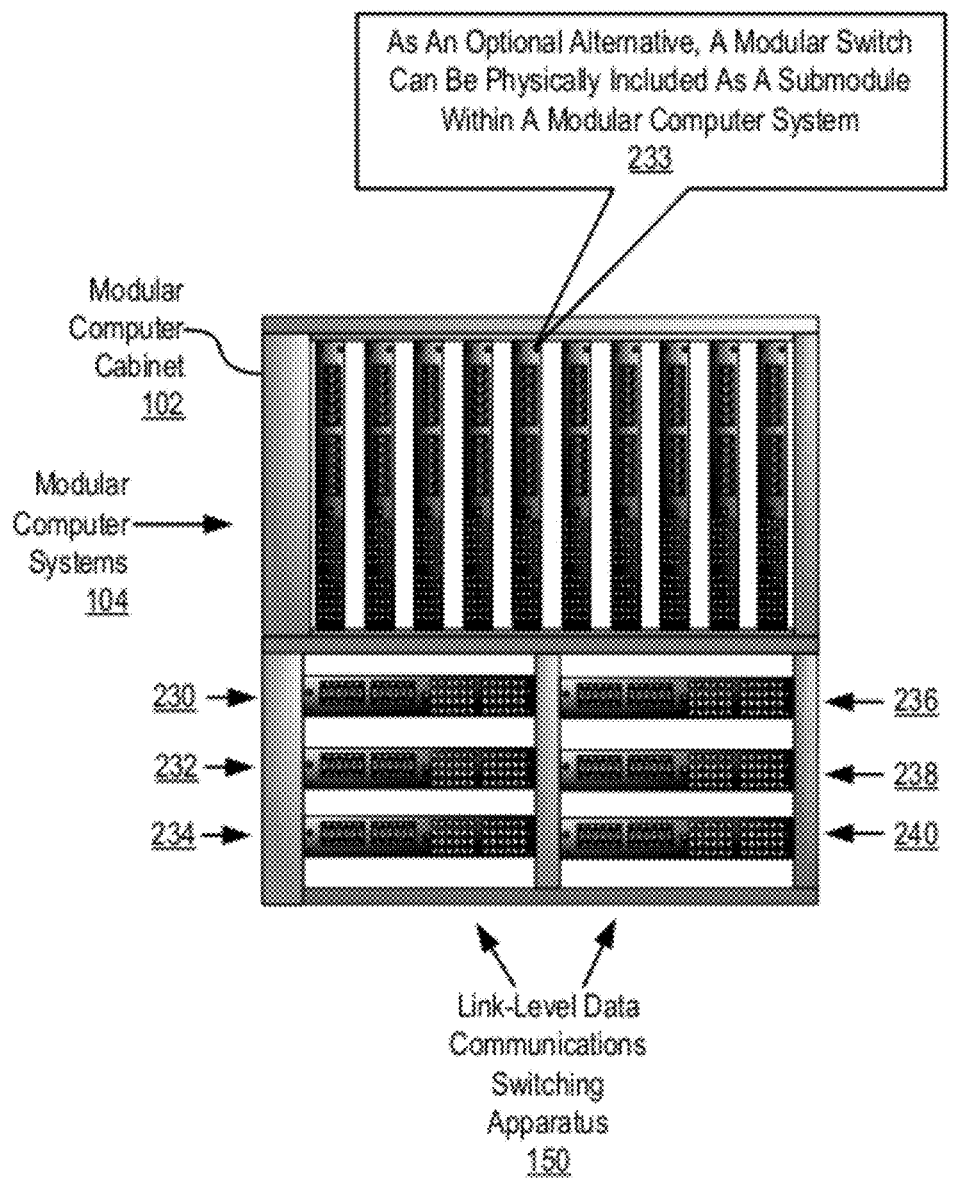
FIG. 1A sets forth a functional block diagram of automated computing machinery, an example modular computer cabinet according to embodiments of the present invention.

For explanation of the modular aspect of apparatus according to embodiments of the present invention, FIG. 1A illustrates a modular computer cabinet (102) that includes a number of modular computer systems (104) as well as link-level data communications switching apparatus (150) composed of several modular link-level data communications switches (230, 232, 234, 236, 238, 240). In the example of FIG. 1A, the modular computer systems (104) have the blade form factor, and the modular link-level data communications switches (230, 232, 234, 236, 238, 240) are rack-mount units. In the example of FIG. 1A, second-layer switches (238, 240) are depicted as modular link-level data communications switches mounted with the modular computer cabinet (102). Readers will recognize that as an optional alternative (233), the second-layer switches (238, 240) can be physically included as a sub-module within a modular computer system (104). Such second-layer switches can be embodied as, for example, a PCI Mezzanine Card, a Switched Mezzanine Card, a riser card, or other form of I/O adapter as will occur to those of skill in the art.

In the example of FIG. 1, the switching apparatus is connected through network connections (218) to several data communications networks (A, B, C, D) and through link-level data communications connections (250) to service applications ($A_1 \ldots A_j$) and terminal applications ($A_{j+1} \ldots A_n$) executing on computers ($C_1 \ldots C_n$). A 'service application,' as the term is used here, is a module of automated computing machinery configured to carry out data processing tasks with regard to data communications packets without altering the packets. The packets travel on data communications networks between a source computer and a destination computer, and the service applications carry out data processing tasks potentially in a manner that is transparent to the operations of the sources as well as the destinations of the packets. Such data processing with regard to the packets can be 'transparent' because the packets are not altered. The data processing tasks carried out by service applications include, for example, security processing, load balancing functions among data communications equipment, statistical surveys, and so on. Such transparent processing can include processing by not just one, but several interim service applications, one providing security services, another performing statistical surveys, another performing load balancing, and so on. The term 'bump-in-the-wire' as applied to the service applications here refers to the fact that, from the point of view of the source or destination, the service applications are physically in-line with the network architectures—as opposed to 'bump-in-the-stack' service applications that may manipulate layer 2/3 protocols like VLANs, ARP, and DHCP to control access to the service applications. A "terminal application", as the term is used here, is a module of automated computing machinery configured to carry out data processing tasks as an end application to devices on the networks. Thus the devices on the networks communicate to and may receive responses from these terminal applications. Terminal applications terminate the protocols running between the devices on the network and the terminal applications.

The terms link-lever and 'layer-2' both refer to the data link layer of the Open Systems Interconnection Reference Model ('OSI Model'). The data link layer is often referred to in this specification as the 'link layer' or the 'link level.' The first, third, and fourth layers of the OSI Model, also pertinent to this discussion, are the Physical Layer, the Network Layer, and the Transport Layer respectively. The Physical Layer of the OSI Model defines the electrical and physical specifications for data communications devices, typically devices connected in effect to a local area network or 'LAN.' Layer 3 or the Network Layer of the OSI Model provides functional and procedural means of transferring variable length data sequences from a source to a destination via one or more networks, generally including routing functions. The Network Layer is implemented with routers that communicate with one another according to data communications protocols. The well known Internet Protocol ('IP') operates generally as an OSI Network Layer data communications protocol. In fact, although IP is definitely not the only Network Layer protocol, IP is so ubiquitous at this point in time as to be almost a synonym for Network Layer functionality. Examples of other layer 3 protocols include ICMP, IGMP, and IPsec. The Transport Layer provides reliable data transfer services to the other layers. The Transport Layer controls the reliability of a given link through flow control as well as segmentation and desegmentation of packets. Transport Layer protocols are typically connection oriented. By far the most common examples of Transport Layer protocols are the Transmission Control Protocol ('TCP') and the User Datagram Protocol ('UDP'). Examples of other layer 4 protocols include DCCP, SCTP, RSVP, and ECN.

The data link layer of the OSI Model is implemented with switches that communicate with one another according to link layer data communications protocols. Like IP in the network layer, the Ethernet protocol, not the only link-level protocol, nevertheless is so ubiquitous as to be almost synonymous with the link layer. Examples of other link-level protocols include ARP, RARP, NDP, OSPF, and L2TP. Link-level switches connect to other devices, typically on a LAN, through connections referred to as 'ports.' Ports can be implemented as wireless connections as well as wireline connections. Each wireline port is made up of the connectors, interconnections, electrical or optical conductors, and so on, as required to effect connections from the switch to other devices, such other devices including, for example, computers on a LAN, other switches, routers, and so on. Wireless ports may include antennas, amplifiers, other radio components, and the like, as needed to effect wireless communications between a switch and other devices. A switch receives data communications in data units referred to as 'packets.' It is common in the art to refer to link layer data units as 'frames,' but this specification uses the slightly more descriptive term 'packets.' In this specification, the term 'packet' refers to all data units in data communications, including units traveling in the physical layer, in the network layer, and in other layers as well.

In the example of FIG. 1, the switching apparatus (150) includes modular link-level data communications switches (230, 232, 234, 236, 238, 240). In the example of FIG. 1, each data communications switch is a device of the kind sometimes referred to as a bridge, an n-port bridge, a layer-2 switch, a smart switch, or just a 'switch.' Within the scope of the present invention, any link-level switch having a number of ports sufficient to support such connectivity among the networks (A, B, C, D), the switches, and the data communications applications can be improved to carry out link-level data communications according to embodiments of the present invention, including, for example, ordinary Ethernet switches. In many embodiments, however, switches that are improved for link-level data communications according to embodiments of the present invention will be fabric-type switches, Fibre Channel switches, Infiniband switches, Ethernet Fabric switches, and so on.

In the example of FIG. 1, the switching apparatus (150) includes two layers of link-level data communications switches (230, 232, 234, 236, 238, 240), a first layer (244) and a second layer (246). The first layer switches (244) are coupled for data communications to data communications networks (A, B, C, D). In the example of FIG. 1, at least some of the first layer switches (244) are incorporated in one or more link aggregation groups (222, 224, 226, 228) for data communications with the networks, each link aggregation group presenting to at least one of the networks multiple physical links as a single logical link. 'Link aggregation group' (LAG), as the term is used here, refers to the use of multiple network cables and ports in parallel to increase link speed beyond the limits of any one single cable or port—and to increase the redundancy for higher availability. A LAG is made up of multiple links that are aggregated together, so that the link aggregation group can be treated as though it were a single link. LAGs are used to 'trunk' links together so that data communications can be distributed and load balanced across the multiple links to provide improved throughput and redundancy compared to a single link. Networks that support link aggregation typically operate a link aggregation protocol that presents multiple physical links to the network as a single logical link. Many LAG implementations conform to an IEEE standard, IEEE 802.1AX. Other terms for link aggregation include 'port teaming,' 'port trunking,' and 'link bundling.' In the example of FIG. 1, the first layer switches (244) are also coupled to one another for link-level data communications by inter-switch links ('ISL') (100). The ISLs (100) implement the first layer switches in the switching apparatus of FIG. 1 as stacked switches, coupled by high-speed interswitch links, operating a stacking protocol (257) that shares configuration data and other administrative data across the switches and presenting a single IP address to a system management server for administrative purposes. Examples of stacking protocols that can be utilized for such switch stacking include the Cisco™ Inter-Switch Link protocol, the Cisco™ Dynamic Inter-Switch Link protocol, and so on. The ISLs serve as communications paths among the first-layer switches, but the second layer switches can also be stacked by running the stacking protocol and sharing administrative communications across links (242). The ISLs (100) in FIG. 1 can be embodied, for example, as an Ethernet link over which data communications between switches are encapsulated according the stacking protocol. The ISLs (100) in FIG. 1 can also be embodied, for a further example, as a connection between the Expansion Ports, or E_ports, of two Fibre Channel switches.

Management within these stacked switches derives link-level switch configuration data from administrative configuration data and distributes this switch configuration to the first and second layer switches. This data contains LAG definitions and switch hardware routing tables such that packets forwarded between attached networks and the modular computer systems do not cross first layer switch ISL links. Further, routing tables are configured and distributed within the stacked switch fabric such that packets are redirected to alternate links in failure scenarios. In specific failure scenarios, traffic may have to temporarily cross first layer switch ISL links to avoid packet loss. In these failure cases, the switch management code can generally reconfigure and distribute routing tables to once again avoid crossing the first level switches ISL links. Optionally, the administrative data may contain rules which redirect packets to alternative processes prior to traditional packet forwarding of the packet to its destination based on the packet destination address. The distributed switch configuration also enables the rule-based redirected packets to be forwarded without crossing any first layer switch ISL link.

In the example of FIG. 1, switches in the switching apparatus are stacked by a stacking protocol (257) that shares administrative configuration information among the switches through the inter-switch links (100), and optionally through links (242), and presents all the switches in the switching apparatus to the networks and to the modular computer systems as a single logical switch. The stacked switches are presented to the networks (A, B, C, D) and to the modular computer systems as a single logical switch in the sense that there is a single IP address for remote administration of the stack of switches as a whole, not an IP address for the administration of each switch within the stack. The stacked switches therefore exhibit the management characteristics of a single switch but have the connectivity and resiliency of the sum of the combined switches.

In the example of FIG. 1, each first layer switch (244) is also coupled for link-level data communications to each of the second layer switches (246). The first layer switches and second layer switches are connected to each other through level-2 data communications links (242). In the example of FIG. 1, each second layer switch (246) is coupled for link-level data communications to at least one of the modular computer systems ($C_1 \ldots C_n$) so that each second layer switch provides data communications connections (250) to the switching apparatus (150) only for data communications applications in the modular computer system to which a second layer switch is coupled.

The link-level data communications switching apparatus (150) of FIG. 1 also includes a plurality of data communications ports. In the example of FIG. 1, at least one of the ports couple the switching apparatus (150) to at least one data communications network, such as networks A, B, C, and D. In the example of FIG. 1, each network is connected to a plurality of devices that function as sources and destinations of data communications packets traveling between the networks and terminal applications (256) in modular computer systems (104). Such source and destination devices in this example include desktop computers (202, 210, 212), a laptop (204), servers (206, 215, 216), and a mobile phone (208).

The example switching apparatus of FIG. 1 operates generally by receiving, in the switching apparatus through an ingress port from a source network, a data communications packet directed to a modular computer system that is running at least one of the terminal applications. The example switching apparatus of FIG. 1 sends the data communications packets to the modular computer system to which the packets are directed.

In the example of FIG. 1, the switching apparatus sends the packet to the modular computer system to which the packet is directed with the packet traversing none of the inter-switch links among the first layer switches. Administrative communications may flow through the ISLs among the first-layer switches, including, for example, the sharing of learned associations among ingress ports and network codes, but none of the packets traveling from a source network to a destination of the packet among the modular computer systems are ever steered across an ISL between any of the first-layer switches. This is a benefit of link-level data communications according to embodiments of the present invention because steering packets through such ISLs is inefficient and bandwidth limiting, always adding at least one additional link to any packet's route among the service applications, often adding more than one link. The switching apparatus can send the packets to the modular computer system to which the packets are directed with no need to traverse first-layer ISLs because of the architecture of the link (242) between the first-layer switches (244) and the second-layer switches (246). The fact that each first layer switch is coupled for link-level data communications to each of the second layer switches means that there is always an available link directly from any first-layer switch to each second-layer switch—and therefore never a need to send a packet across a first-layer ISL to get the packet from any first-layer switch to any second-layer switch.

In the example of FIG. 1, at least two additional ports in the switching apparatus (150) are connected to service applications (254) running on at least two of the modular computer systems that carry out transparent, bump-in-the-wire data processing of the data communications packets traveling between the networks and the terminal applications. The service applications (254) are labeled $A_1 \ldots A_j$ to denote that, although there are only four ports expressly connected to two service applications in this example, in fact a switching apparatus that carries out link-level data communications according to embodiments of the present invention can include any number of connections to any number of bump-in-the-wire service applications. Further in the example of FIG. 1, at least one additional port in the switching apparatus (150) is connected to a terminal application (254) running on at least on of the modular computer systems that terminate the communications protocols from devices on the networks. The terminal application (254) is labeled $A_n$, to denote that, although there is only one port expressly connected to one terminal application in this example, in fact a switching apparatus that carries out link-level data communications according to embodiments of the present invention can include any number of connections to any number of terminal applications. Each application (254) in FIG. 1 is associated with a unique, link-level identifier (252), designated in this example as $ID_1 \ldots ID_n$, where $ID_1$ is the link-level identifier for service application $A_1$, $ID_2$ is the link-level identifier for service application $A_2$, and so on through service application $A_n$ and its link-level identifier $ID_n$. Examples of link-level identifiers include a Media Access Control ('MAC') address and a World Wide Name ('WWN') or World Wide Identifier ('WWID'). MAC addresses are used generally in Ethernet addressing, and WWNs or WWIDs are used in other contexts including, for example, Fibre Channel addressing and in Serial Attached SCSI storage networks.

Packets are steered through the service applications without using any link-level identifiers of the service applications. Routing through these service applications is accomplished by the use of rules triggered by packet ingress port, packet attributes, and/or metadata that the switch has associated with the packet. These rules take precedence over traditional packet forwarding and redirect the packets to these service applications. When a packet ingresses to a switch from a service application and has not triggered a redirection rule, the switch traditional packet forwarding will proceed to forward the packet based on its destination addressing toward its target network or terminal application destination.

Link-level data communications according to embodiments of the present invention is carried out on a switching apparatus composed of link-level data communications switches. For further explanation, therefore, FIG. 2 sets forth a functional block diagram of automated computing machinery, a link-level data communications switch (230) adapted for link-level data communications according to embodiments of the present invention.

Figure 2:
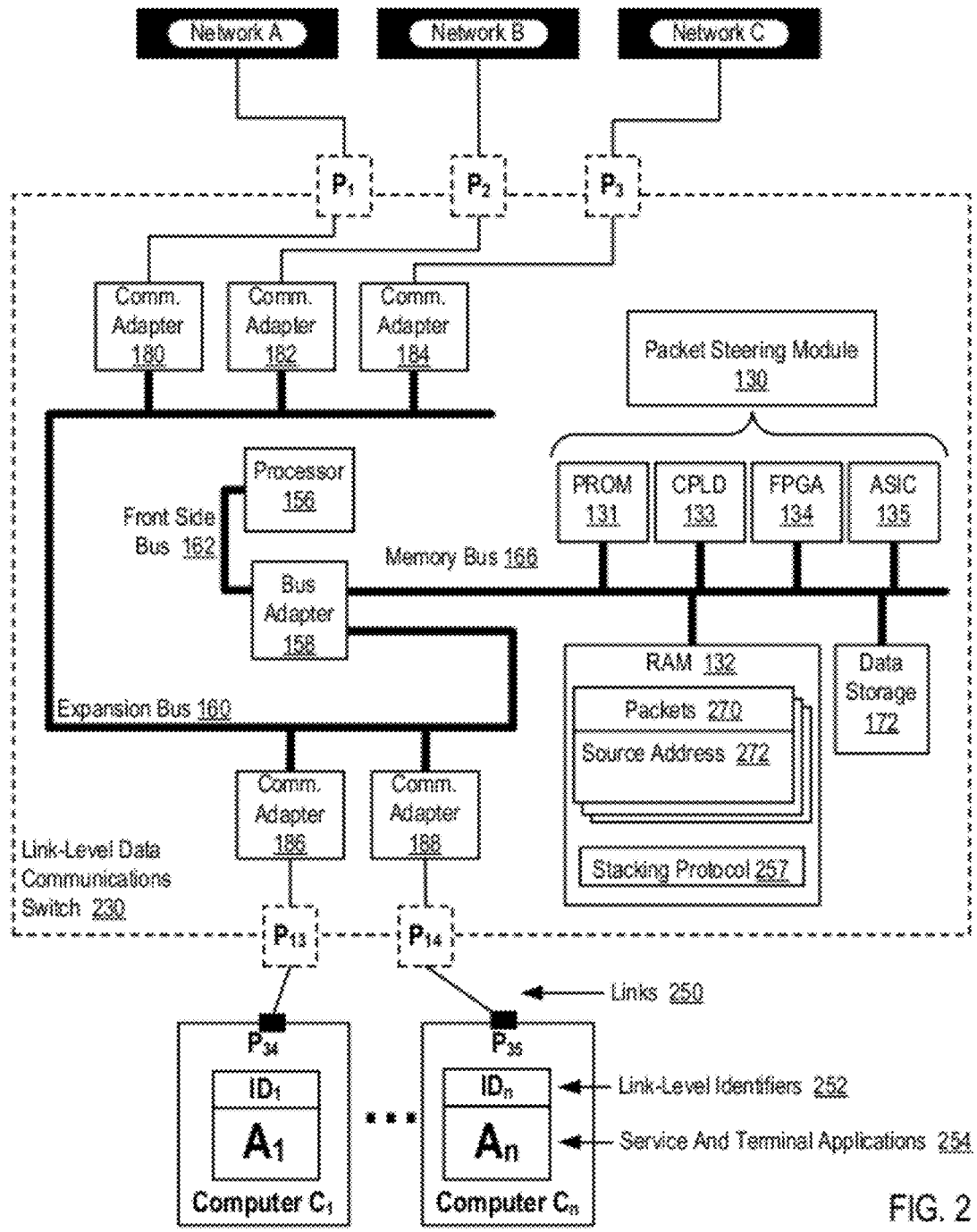
FIG. 2 sets forth a functional block diagram of automated computing machinery, a link-level data communications switch adapted for link-level data communications according to embodiments of the present invention.

The switch (230) of FIG. 2 includes at least one data communications processor (156) as well as random access memory (132) ('RAM') which is connected through a high speed memory bus (166) and bus adapter (158) to processor (156) and to other components of the switch (230). The data communications processor (156) is also operatively coupled through an expansion bus (160) to a number of data communications ports ($P_1$, $P_2$, $P_3$, $P_{13}$, $P_{14}$). The data communications processor can be implemented as any of a variety of computer microprocessors or microcontrollers including, for example, a Motorola 68000™, an IBM POWER™ architecture processor, an Intel Pentium™, and so on. The processor (156) in this example is coupled to the ports through an expansion bus (160) and several communications adapters (180, 182, 184, 186, 188). The communications adapters implement data communications through the ports with other switches, routers, networks (A, B, C), computers, and service applications (254) running on other computers ($C_1$, $C_n$). Such communications are so often networked that a communications adapter is often referred to as a 'network interface card' or 'NIC.' Communications adapters implement the hardware level of data communications through which one computer, router, or switch sends data communications to another computer, router, or switch, directly or through a data communications network. Examples of communications adapters useful for link-level data communications according to embodiments of the present invention include modems for wired dial-up communications, Ethernet (IEEE 802.3) adapters for wired data communications network communications, and 802.11 adapters for wireless data communications network communications.

In the example of FIG. 2, ports $P_1$, $P_2$, and $P_3$ are connected through wireline connections to data communications networks A, B, and C. Ports $P_{13}$ and $P_{14}$ are connected to service applications ($A_1 \ldots A_n$) executing on computers ($C_1 \ldots C_n$). In this example, each port ($P_1$, $P_2$, $P_3$, $P_{13}$, $P_{14}$) is capable of functioning as an ingress port or an egress port for data communications among the networks and the switches. That is, data traffic through the switch (230) is generally bidirectional.

In the example of FIG. 2, the switch also includes data storage (172) operatively coupled to the processor (156). The data storage (172) can be implemented in a number of forms as will occur to those of skill in the art, including, for example, a microdrive or electrically erasable programmable read-only memory ('EEPROM' or 'flash').

The example switch (230) of FIG. 2 also includes a packet steering module (130), a module of automated computing machinery configured to carry out link-level data communications according to embodiments of the present invention. The packet steering module (130) may be implemented as, for example, a control program stored in random access memory ('RAM') (132) or stored in a programmable read only memory ('PROM') ('131'). Or the packet steering module (130) may be implemented as a complex programmable logic device ('CPLD') (133), a field programmable gate array ('134'), or as an application specific integrated circuit ('ASIC') (135).

The switch (230) in this example steers packets under control of the packet steering module (130) according to embodiments of the present invention by receiving in the switch through an ingress port from the first network data communications packets (270) directed to a modular computer system that is running at least one of the terminal applications. Each such packet contains a destination network address (274) that identifies the destination of the packet directed to a modular computer system that is running a terminal application. The switch in the example of FIG. 2 receives, in the switch through an ingress port ($P_1$, $P_2$, or $P_3$) from a source network, data communications packets (270) that are optionally directed to a modular computer system that is running at least one of the service applications. The switch in FIG. 2 also sends the packet to the modular computer system that is running the terminal application to which the packet is directed. The switch may utilize load distribution to spread traffic among a plurality of computer systems, each running an instance an application. In the example of FIG. 2, the switch sends the packet to the modular computer system to which the packet is directed and optionally through service applications with the packet traversing none of the inter-switch links among the first layer switches.

Further, the switch (230) in this example steers packets under control of the packet steering module (130) according to embodiments of the present invention by receiving in the switch through an ingress port from a modular computer system running a terminal application communications packets (270) directed to a device on a network. Each such packet contains a destination network address (274) that identifies the destination of the packet directed to a device on a network. The switch in the example of FIG. 2 receives, in the switch through an ingress port ($P_{13}$, or $P_{14}$) from a terminal application, data communications packets (270) that are optionally directed to a modular computer system that is running at least one of the service applications. The switch in FIG. 2 also sends the packet to the network which contains the device to which the packet is directed. The switch may utilize load distribution to spread traffic among a plurality of computer systems, each running an instance a service application. Further the switch may utilize load distribution to spread traffic among a plurality of ports within a LAG to the network to which the packet is directed. In the example of FIG. 2, the switch sends the packet to the network port of the network containing the device to which the packet is directed and optionally through service applications with the packet traversing none of the inter-switch links among the first layer switches.

Figure 3:
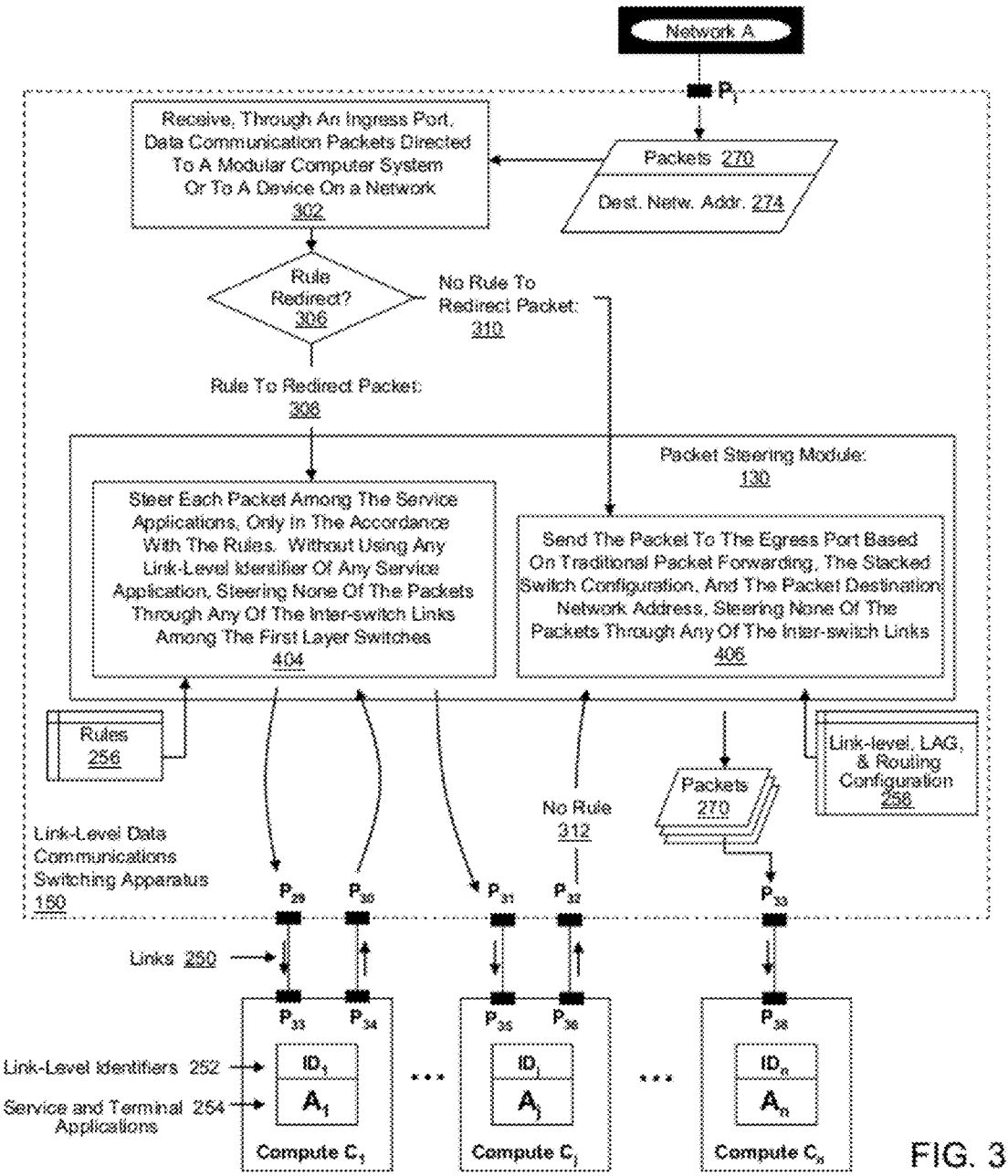
FIG. 3 sets forth a flow chart illustrating an example method of link-level data communications according to embodiments of the present invention.

For further explanation, FIG. 3 sets forth a flow chart illustrating an example method of link-level data communications according to embodiments of the present invention. The method of FIG. 3 is carried out in a link-level data communications switching apparatus (150) like the switching apparatus described above with reference to FIG. 1, and the method of FIG. 3 is discussed here with reference both to FIG. 3 and also to FIG. 1. The switching apparatus (150) includes modular link-level data communications switches disposed within a modular computer cabinet. The modular computer cabinet also has disposed within it a plurality of modular computer systems.

The link-level data communications switching apparatus (150) also includes a first layer (244) and second layer (246) of modular link-level data communications switches. In the example of FIG. 3, the first layer switches (244) are coupled for data communications to data communications networks (A, B, C, D), and the first layer switches are also coupled to one another for link-level data communications by inter-switch links (100). Each first layer switch (230, 232, 234, 236) is also coupled for link-level data communications to each of the second layer switches (246), and each second layer switch (238, 240) is coupled for link-level data communications to at least one of the modular computer systems (104) so that each second layer switch provides data communications connections to the switching apparatus only for service applications (254) in the modular computer system to which a second layer switch is coupled. In the example of FIG. 3, all the switches stacked by a stacking protocol share administrative configuration information among the switches through the inter-switch links (100) and all the switches in the switching apparatus are presented to the networks and to the modular computer systems as a single logical switch.

In the example of FIG. 3, the switching apparatus also includes a plurality of data communications ports. At least one of the ports couple the switching apparatus to at least one data communications network. The switching apparatus (150) also includes at least two additional ports ($P_{29}$, $P_{30}$, $P_{31}$, $P_{32}$) connected to service applications (254) running on at least two of the modular computer systems that carry out transparent, bump-in-the-wire data processing of data communications packets (270) traveling between the network and at least one terminal application. In the example, with packets traveling from network to terminal application, some ports function as an ingress port ($P_i$, $P_{30}$, $P_{32}$) only, and some ports function as an egress port ($P_{29}$, $P_{31}$, $P_{33}$) only, for data communications from the networks through the service applications to the terminal application. Each application in FIG. 3 is associated with a unique, link-level identifier (252) such as a MAC address, a WWID or a WWN.

In the example of FIG. 3, the switching apparatus (150) determines (306) by a Rule whether packets (270) entering the switching apparatus from a network are directed through service application first and then to the terminal application or directly to a terminal application to which the packet is directed.

The method of FIG. 3 includes receiving (302), in the switching apparatus (150) through an ingress port ($P_i$) from a source network, a data communication packet (270) directed to a modular computer system that is running a terminal application. Each packet contains a destination network address (274) that identifies a destination of the packet among the modular computer systems running terminal applications. The example of FIG. 3 also includes, in the absence of any rule (310) redirecting the packet, sending (406) of the packet to the modular computer system to which the packet is directed. In the example of FIG. 3, the packet is directed between first layer switch in which the packet was received from the network, to the application port on a second-layer switch, using the stacked switch configuration such that the packet traverses none of the inter-switch links among the first layer switches. The switching apparatus can send the packets to the modular computer system port to which the packet is directed with no need to traverse first-layer ISLs because of the architecture of the link (242) between the first-layer switches (244) and the second-layer switches (246) as described above.

Figure 4:
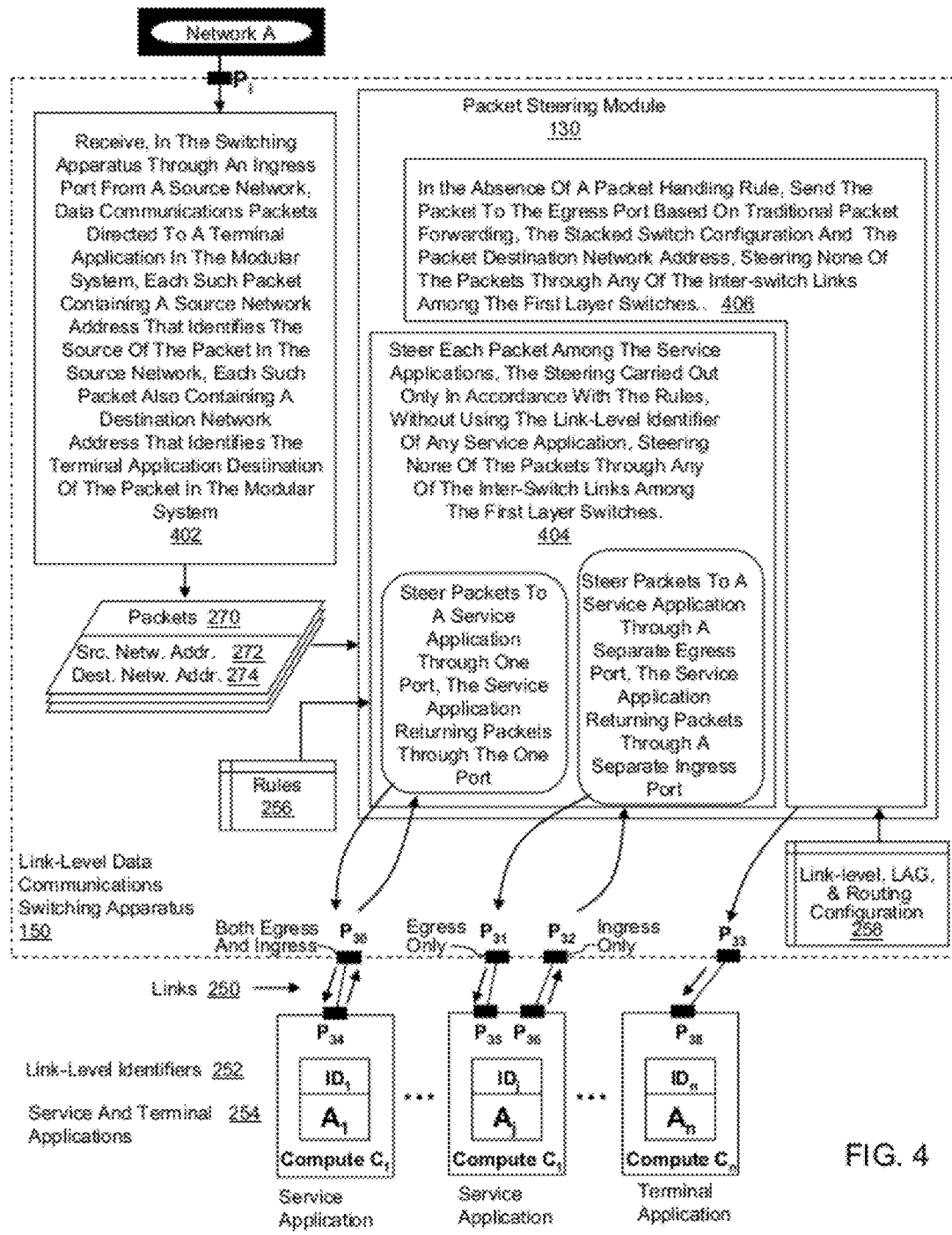
FIG. 4 sets forth a flow chart illustrating an example method of link-level data communications according to embodiments of the present invention.

The example of FIG. 3 includes receiving (402), in the switching apparatus (150) through an ingress port ($P_i$) from a source network, data communications packets directed to a destination terminal application (254) within the modular computer cabinet (102). The example of FIG. 3 also includes steering (404) by the switching apparatus (150) each packet (270) among the service applications (254). In the example of FIG. 3, the switching apparatus includes rules (256) which govern the steering of data communications among service applications (254) between networks connected to the switching apparatus (150) and terminal applications (254) connected to the switching apparatus. Steering (404) each packet (270) among the service applications (254) is carried out only in accordance with the rules (256), without using the link-level identifier (252) of any service application (254). In the example of FIG. 3, on ingress to the switching apparatus from a service application port and no rule applies (312) to the packet, sending (406) of the packet to the modular computer system to which the packet is directed. In the method of FIG. 4, the steering to the terminal application is carried out by traditional packet forwarding (406) by use of the link-level identifier of the terminal application. In either case, the switching apparatus (150) of FIG. 3 steers none of the packets (271) directed to a destination terminal application (254) through any ISLs (100) among first-layer switches (244).

The logic in the switching apparatus (150) of the example of FIG. 3, further applies to packets which ingress the switching apparatus from a terminal application (254) and are directed to a network or another terminal application (254). The switching apparatus (150) determines (306) by use of the configured rules whether packets entering the switching apparatus from a terminal application are directed through service application (254) first or directly to a network. Packets which ingress to the switch apparatus from an application (254) and with absence of a rule (256) to direct the packet to a service application, will be directed by the switch apparatus by use of traditional packet forwarding (406) using the packet destination address to identify the network egress.

Each rule (256) in FIG. 3 includes an association of an ingress port, optionally one or more packet attributes, and a switch egress. The rules and process is further explained in Table 3 in reference to FIG. 1 and FIG. 3. The rule set comprises entries in Table 3 at process references 1-4. Entries in the table process references 5-13 are routing decisions made by the switching apparatus (150) using traditional packet forwarding (406) as determined by the stacked switch configuration to include the Forward Data Base (FDB) which may use dynamic MAC discovery. In this example, because the switches within the switching apparatus (150) are logically stacked to form a single switch image for LAG and application definitions, rules can be written and traditional packet forwarding tables used to define ports into and out of the switching apparatus. Stacking and routing tables distributed to the first layer switches (244) and second layer switches (246) within the stacked switching apparatus (150) direct the packets on the internal switch to switch links toward the switching apparatus egress port. The rules (256) or traditional packet forwarding (406) select the switching apparatus egress port or LAG. If the packet is directed to a LAG, then the LAG definition will enable the packet steering module (130) to select a specific switching apparatus egress port within the LAG. The stacking and routing tables in the packet steering module allow the switch to select the local switch port between the first layer and second layer switches such that the packet will not flow across a first layer ISL link to arrive at its switching apparatus egress port.

In the example of Table 3, packets from any network with the protocol in the header set to TCP are steered first to service application $A_1$ and then to service application $A_j$ and then terminal application $A_n$. All other packets from any network are steered directly to terminal application $A_n$ using the packet destination address. Packets from terminal application $A_n$ with the protocol in the header set to TCP are steered first to service application $A_j$ and then to service application $A_1$ and then to the destination network based on the packet destination address. All other packets from terminal application $A_n$ are steered directly to the destination network based on the packet destination address.

ence 2 steers packets which ingress the switch on port $P_{30}$ and with TCP protocol to egress through port $P_{31}$ toward service application $A_j$. The switch stacking and routing tables in Switch 238 are used to select the path from the plurality of paths from Switch 238 to Switch 240, and the link on which to forward the packet toward switch port $P_{31}$. This path selection may be done using a load distribution algorithm. Assuming that the path selected was through first layer Switch 234, the packet would egress Switch 238 on port $P_{23}$ toward Switch 234. The packet ingress on port $P_{17}$ on Switch 234, would then be steered to egress on $P_{18}$ toward Switch 240. The packet ingress on port $P_{27}$ on Switch 240, would then be steered to egress on $P_{31}$ toward service application $A_j$. Without further detail, using the stacked switch routing tables packets are routed from second layer switch to second layer switch to enable packet forwarding from any application ingress port to any other application egress port without crossing a first layer switch ISL link. Likewise, using the stacked switch routing tables enable a packet from any application ingress port destined to any network egress port to be steered between the second layer switch and the first layer switch with the selected network egress port without crossing any first layer switch ISL link.

Any packet received on any port ingress which does not match any rule, will be directed by traditional packet forwarding (406) using the packet destination address along with application or network link-level identifiers. In the example

TABLE 3

Process Table

| Process Reference Number | Switch Ingress Port | Rule Number or Process | Switch Egress Port or LAG | Packet Attribute(s) Used |
|---|---|---|---|---|
| 1 | $P_1, P_2, P_3, P_4$ $P_5, P_6, P_7, P_8$ $P_9, P_{10}, P_{11}, P_{12}$ | Rule 1 | $P_{29}$ | Protocol = TCP (for example) |
| 2 | $P_{30}$ | Rule 2 | $P_{31}$ | Protocol = TCP (for example) |
| 3 | $P_{38}$ | Rule 3 | $P_{32}$ | Protocol = TCP (for example) |
| 4 | $P_{31}$ | Rule 4 | $P_{30}$ | Protocol = TCP (for example) |
| 5 | Don't Care | Traditional Packet Forward. | $P_{33}$ | Destination Address Terminal Application $A_n$ |
| 6 | $P_{33}$ | Traditional Packet Forward. | LAG 222 | Link-Level Destination Address (Network A) |
| 7 | $P_{33}$ | Traditional Packet Forward. | LAG 224 | Link-Level Destination Address (Network B) |
| 8 | $P_{33}$ | Traditional Packet Forward. | LAG 226 | Link-Level Destination Address (Network C) |
| 9 | $P_{33}$ | Traditional Packet Forward. | LAG 228 | Link-Level Destination Address (Network D) |
| 10 | $P_{29}$ | Traditional Packet Forward. | LAG 222 | Link-Level Destination Address (Network A) |
| 11 | $P_{29}$ | Traditional Packet Forward. | LAG 224 | Link-Level Destination Address (Network B) |
| 12 | $P_{29}$ | Traditional Packet Forward. | LAG 226 | Link-Level Destination Address (Network C) |
| 13 | $P_{29}$ | Traditional Packet Forward. | LAG 228 | Link-Level Destination Address (Network D) |

In the example of Table 3, at process reference 1 is rule 1 which steers packets from any network ingress in the switching apparatus with TCP protocol to egress through port $P_{29}$ toward service application $A_1$. The switch stacking and routing tables are used to select the direct link, without crossing a first layer switch ISL link, between the receiving first layer switch and Switch 238 in the second switch layer on which to forward the packet. Switch 238, then using the stacking routing table to direct the packet to $P_{29}$. Rule 2 at process referof Table 3, at process reference 5, packets not meeting any rule but with destination address for terminal application $A_n$ will be directed to port $P_{33}$ to egress to application $A_n$. As such packets with destination address of terminal application $A_n$ without the TCP protocol that ingress switch apparatus on network ports will be forwarded toward port $P_{33}$. Also packets with destination address of terminal application $A_n$ with the TCP protocol which ingress the switch at port $P_{32}$ will be forwarded toward port $P_{33}$.

Further at Table 3 process reference 3 is rule 3, which steers packets with packet TCP protocol which ingress on port $P_{33}$ from terminal application $A_n$ to port $P_{33}$ toward service application $A_j$. Further at Table 3 process reference 4 is rule 4, which steers packets with packet TCP protocol which ingress on port $P_{31}$ from service application $A_j$ to port $P_{30}$ toward service application $A_1$. As was the case above for forwarding packets from switch 238 to switch 240, there is a plurality of paths from which a selection is made for sending a packet from switch 240 to port $P_{30}$ on switch 238 toward service application $A_1$.

Further at Table 3, process references 6 to 13 direct packets received from either port $P_{29}$ from service application $A_1$ or port $P_{31}$ from terminal application $A_n$ to the network with the device to which the packet is directed by its destination address. In all cases the packet will be forwarded by the receiving second layer switch (246) to a first layer switch (244) which has connectivity to the destination network. For example process reference 6 directs packet to LAG 222 based on the packet destination address to a device in Network A. In this example with reference to FIG. 1, the stacking table for LAG 222 would contain ports $P_i$ and $P_4$. The receiving second layer switch (240) selects one of the ports (assume $P_4$) from the LAG definition to which to direct the packet. The packet steering function in the second layer switch (240) uses the egress port selected ($P_4$) with the routing tables to select the port ($P_{26}$) to the first layer switch (232) which has the port ($P_4$) to the destination network (Network A).

For further explanation, FIG. 4 sets forth a flow chart illustrating an example method of link-level data communications according to embodiments of the present invention. The method of FIG. 4 is carried out in a link-level data communications switching apparatus (150) like the switching apparatus described above with reference to FIG. 1, and the method of FIG. 4 is discussed here with reference both to FIG. 4 and also to FIG. 1. The switching apparatus (150) includes modular link-level data communications switches disposed within a modular computer cabinet. The modular computer cabinet also has disposed within it a plurality of modular computer systems.

The link-level data communications switching apparatus (150) also includes a first layer (244) and second layer (246) of modular link-level data communications switches. In the example of FIG. 4, the first layer switches (244) are coupled for data communications to data communications networks (A, B, C, D), and the first layer switches are also coupled to one another for link-level data communications by inter-switch links (100). Each first layer switch (230, 232, 234, 236) is also coupled for link-level data communications to each of the second layer switches (246), and each second layer switch (238, 240) is coupled for link-level data communications to at least one of the modular computer systems (104) so that each second layer switch provides data communications connections to the switching apparatus only for service applications (254) in the modular computer system to which a second layer switch is coupled. In the example of FIG. 4, all the switches stacked by a stacking protocol share administrative configuration information among the switches through the inter-switch links (100) and all the switches in the switching apparatus are presented to the networks and to the modular computer systems as a single logical switch.

In the example of FIG. 4, the switching apparatus also includes a plurality of data communications ports. At least one of the ports couple the switching apparatus to at least one data communications network. The switching apparatus (150) also includes at least two additional ports ($P_{30}$, $P_{31}$, $P_{32}$) connected to service applications (254) running on at least two of the modular computer systems that carry out transparent, bump-in-the-wire data processing of data communications packets (270) traveling between the networks and at least one terminal application. In the example, with packets traveling from network to terminal application, some ports function as an ingress port ($P_i$, $P_{31}$) only, some ports function as an egress port ($P_{32}$, $P_{33}$) only, and some ports function as both an ingress port and an egress port ($P_{30}$) for data communications. Each application in FIG. 4 is associated with a unique, link-level identifier (252) such as a MAC address, a WWID or a WWN.

The example of FIG. 4 is similar to the example of FIG. 3, including as it does receiving (302), in the switching apparatus (150) through an ingress port from a source network, a data communications packet directed to a modular computer system that is running at least one of the terminal applications. The example of FIG. 4 is further similar to the example of FIG. 3 and also includes sending (304) the data communications packets to the modular computer system to which the packets are directed, the packet traversing none of the inter-switch links among the first layer switches.

In the example of FIG. 4, the switching apparatus includes rules (256) which govern the steering of data communications from the network ingress ($P_i$) and among service applications (254). Each rule (256) in FIG. 4 includes an association of an ingress port, optionally a set packet attributes, and a switch egress.

The example of FIG. 4 includes receiving (402), in the switching apparatus (150) through an ingress port ($P_i$) from a source network, data communications packets (271) directed to a destination terminal application (254). Each packet (271) contains a source network address (272) that identifies the source of the packet in the source network. Each packet also contains a destination network address (274) that identifies the destination of the packet to the terminal application. The example of FIG. 4 also includes steering (404) by the switching apparatus (150) each packet (271) among the service applications (254) and to the terminal application. In the method of FIG. 4, the steering of packets among service applications is carried out only in accordance with the rules (256), without using the link-level identifier (252) of any service application (254). In the example of FIG. 3, on ingress to the switching apparatus from a service application port and no rule applies to the packet, sending (406) of the packet to the modular computer system to which the packet is directed. In the method of FIG. 4, the steering to the terminal application is carried out by traditional packet forwarding (406) by use of the link-level identifier of the terminal application. In the example of FIG. 4, the switching apparatus (150) steers none of the packets (271) directed to a destination terminal application (406) through any ISLs (100) among first-layer switches (244).

In the example of FIG. 4, the switching apparatus (150) is configured, for at least some of the service applications, with two ports ($P_{31}$, $P_{32}$) coupled to each such service application. In the example of FIG. 4 with packet from a network directed to a terminal application, one port ($P_{31}$) is for egress of packets (271) from the switching apparatus (150) to such service applications and another port ($P_{32}$) is for ingress of packets from the service applications. In this example, steering (404) each packet (271) among the service applications includes steering (408) each packet from the switching apparatus (150) to such a service application through a separate egress port ($P_{31}$), each such service application carrying out its data processing related to each packet and then returning each packet to the switching apparatus through a separate ingress port ($P_{32}$).

In the example of FIG. 4, the switching apparatus (150) is also configured, for at least some of the service applications, with only one port ($P_{30}$) coupled to a service application. In such an example, steering (404) each packet (271) among the service applications includes steering (406) each packet from the switching apparatus to a service application through the one port ($P_{30}$) coupling such a service application (254) to the switching apparatus, each such service application carrying out its data processing related to each packet and then returning each packet to the switching apparatus through the one port ($P_{30}$).

In the example of FIG. 4, steering (404) each packet among the service applications also includes, upon receiving a packet through an ingress port from a source network, selecting, in dependence upon the ingress port through which the packet was received, a rule that governs steering the packet to a switch egress. Selecting, in dependence upon the ingress port through which the packet was received, a rule that governs steering the packet to a switch egress can be carried out, for example, by using the ingress port number to select a rule from a rules table as described above with reference to Table 3.

Exemplary embodiments of the present invention are described largely in the context of a fully functional computer system for steering data communications packets between networks and terminal applications. Additionally, it optionally includes the steering of these packets among service applications for transparent, bump-in-the-wire processing. Readers of skill in the art will recognize, however, that the present invention also may be embodied in a computer program product disposed on recordable media for machine-readable information, including magnetic media, optical media, or other suitable media. Examples of recordable media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of link-level data communications,
the method carried out in link-level data communications switching apparatus, the switching apparatus comprising modular link-level data communications switches disposed within a modular computer cabinet, the modular computer cabinet also having disposed within it a plurality of modular computer systems;

the switching apparatus configured as two layers of link-level data communications switches, a first layer and a second layer, the first layer switches coupled for data communications to data communications networks, the first layer switches also coupled to one another for link-level data communications by inter-switch links, each first layer switch also coupled for link-level data communications to each of the second layer switches, each second layer switch coupled for link-level data communications to at least one of the modular computer systems so that each second layer switch provides data communications connections to the switching apparatus only for service applications in the modular computer system to which a second layer switch is coupled;

all the switches stacked by a stacking protocol that shares administrative configuration information among the switches through the inter-switch links and presents all the switches in the switching apparatus to the networks and to the modular computer systems as a single logical switch;

the switching apparatus further comprises a plurality of data communications ports, at least one of the ports coupling the switching apparatus to at least one data communications network, at least one additional port connected to an application running on at least one of the modular computer systems that carry out processing of data communications packets traveling from the network(s), each application associated with a unique, link-level identifier;

the switching apparatus further comprises rules governing the steering of data communications among service applications between networks connected to the switching apparatus and terminating applications connected to the switching apparatus, each rule comprising an association of an ingress port and a switch egress;

the method comprising:

receiving, in the switching apparatus through an ingress port from a source network, data communications packets directed to a destination modular computer system, each such packet containing a source network address that identifies the source of the packet in the source network, each such packet also containing a destination network address that identifies a destination of the packet in the modular computer system;

steering by the switching apparatus each such packet among the service applications and toward the destination modular computer system, such steering carried out only in accordance with the rules, without using the link-level identifier of any service application, steering none of the packets directed to a destination modular computer system through any of the inter-switch links among the first layer switches;

steering, by the switching apparatus in the absence of a rule, each such packet through an egress port to the destination modular computer system using the link-level identifier of the terminal application without using any of the inter-switch links among the first layer switches;

receiving, in the switching apparatus through an ingress port from a modular computer system, data communications packets directed to a destination network, each such packet containing a source network address that identifies the source of the packet in the modular computer system, each such packet also containing a destination network address that identifies a destination of the packet in the destination network;

steering by the switching apparatus each such packet among the service applications and toward the destination network, such steering carried out only in accordance with the rules, without using the link-level identifier of any service application, steering none of the packets directed to a destination network through any of the inter-switch links among the first layer switches; and steering, by the switching apparatus in the absence of a rule, each such packet through an egress port to the destination network using the link-level identifier of the network device and without using the inter-switch links among the first layer switches.

2. The method of claim 1 wherein at least some of the first layer switches are incorporated in one or more link aggregation groups for data communications with the networks, each link aggregation group presenting to at least one of the networks multiple physical links as a single logical link.

3. The method of claim 1 wherein:
the switching apparatus is configured, for at least some of the service applications, with two ports coupled to each such service application, one port for egress of packets from the switching apparatus to such service applications the packets directed toward a terminating application, and ingress of packets from the service application the packets directed toward a network: and another port for egress of packets from the switching apparatus to such service applications the packets directed toward a network, and ingress of packets from such service applications the packets directed toward a terminating application; and
steering each packet among the service applications further comprises steering each packet from the switching apparatus to such a service application through a separate egress port, each such service application carrying out its data processing related to each packet and then returning each packet to the switching apparatus through a separate ingress port.

4. The method of claim 1 wherein:
the switching apparatus is configured, for at least some of the service applications, with only one port coupled to each such service application; and
steering each packet among the service applications further comprises steering each packet from the switching apparatus to such a service application through the one port coupling such a service application to the switching apparatus, each such service application carrying out its data processing related to each packet and then returning each packet to the switching apparatus through the one port.

5. The method of claim 1 wherein steering each packet among the applications further comprises, upon receiving a packet through an ingress port from a source network or application in a modular computer system, selecting, in dependence upon the ingress port through which the packet was received, a rule that governs steering the packet to a switch egress.

6. An apparatus for link-level data communications, the apparatus comprising:
a link-level data communications switching apparatus, the switching apparatus comprising modular link-level data communications switches disposed within a modular computer cabinet, the modular computer cabinet also having disposed within it a plurality of modular computer systems;
the switching apparatus configured as two layers of link-level data communications switches, a first layer and a second layer, the first layer switches coupled for data communications to data communications networks, the first layer switches also coupled to one another for link-level data communications by inter-switch links, each first layer switch also coupled for link-level data communications to each of the second layer switches, each second layer switch coupled for link-level data communications to at least one of the modular computer systems so that each second layer switch provides data communications connections to the switching apparatus only for service applications in the modular computer system to which a second layer switch is coupled;
all the switches stacked by a stacking protocol that shares administrative configuration information among the switches through the inter-switch links and presents all the switches in the switching apparatus to the networks and to the modular computer systems as a single logical switch;
the switching apparatus further comprises a plurality of data communications ports, at least one of the ports coupling the switching apparatus to at least one data communications network, at least one additional port connected to an application running on at least one of the modular computer systems that carry out processing of data communications packets traveling from the networks, each application associated with a unique, link-level identifier;
the switching apparatus further comprises rules governing the steering of data communications among service applications between networks connected to the switching apparatus and terminating applications connected to the switching apparatus, each rule comprising an association of an ingress port and a switch egress;
the apparatus configured to carry out the steps of:
receiving, in the switching apparatus through an ingress port from a source network, data communications packets directed to a destination modular computer system, each such packet containing a source network address that identifies the source of the packet in the source network, each such packet also containing a destination network address that identifies a destination of the packet in the modular computer system;
steering by the switching apparatus each such packet among the service applications and toward the destination modular computer system, such steering carried out only in accordance with the rules, without using the link-level identifier of any service application, steering none of the packets directed to a destination modular computer system through any of the inter-switch links among the first layer switches;
steering, by the switching apparatus in the absence of a rule, each such packet through an egress port to the destination modular computer system using the link-level identifier of the terminal application without using any of the inter-switch links among the first layer switches;
receiving, in the switching apparatus through an ingress port from a modular computer system, data communications packets directed to a destination network, each such packet containing a source network address that identifies the source of the packet in the modular computer system, each such packet also containing a destination network address that identifies a destination of the packet in the destination network;
steering by the switching apparatus each such packet among the service applications and toward the destination network, such steering carried out only in accordance with the rules, without using the link-level identifier of any service application, steering none of the packets directed to a destination network through any of the inter-switch links among the first layer switches; and
steering, by the switching apparatus in the absence of a rule, each such packet through an egress port to the destination network using the link-level identifier of the network device and without using the inter-switch links among the first layer switches.

7. The apparatus of claim 6 wherein at least some of the first layer switches are incorporated in one or more link aggregation groups for data communications with the networks, each link aggregation group presenting to at least one of the networks multiple physical links as a single logical link.

8. The apparatus of claim 6 wherein:
the switching apparatus is configured, for at least some of the service applications, with two ports coupled to each such service application, one port for egress of packets from the switching apparatus to such service applications the packets directed toward a terminating application, and ingress of packets from the service application the packets directed toward a network: and another port for egress of packets from the switching apparatus to such service applications the packets directed toward a network, and ingress of packets from such service applications the packets directed toward a terminating application; and
steering each packet among the service applications further comprises steering each packet from the switching apparatus to such a service application through a separate egress port, each such service application carrying out its data processing related to each packet and then returning each packet to the switching apparatus through a separate ingress port.

9. The apparatus of claim 6 wherein:
the switching apparatus is configured, for at least some of the service applications, with only one port coupled to each such service application; and steering each packet among the service applications further comprises steering each packet from the switching apparatus to such a service application through the one port coupling such a service application to the switching apparatus, each such service application carrying out its data processing related to each packet and then returning each packet to the switching apparatus through the one port.

10. The apparatus of claim 6 wherein steering each packet among the applications further comprises, upon receiving a packet through an ingress port from a source network or application in a modular computer system, selecting, in dependence upon the ingress port through which the packet was received, a rule that governs steering the packet to a switch egress.

11. A computer program product for link-level data communications carried out in link-level data communications switching apparatus, the computer program product disposed in recordable medium for machine-readable information, wherein the recordable medium is not a signal,
the switching apparatus comprising modular link-level data communications switches disposed within a modular computer cabinet, the modular computer cabinet also having disposed within it a plurality of modular computer systems;
the switching apparatus configured as two layers of link-level data communications switches, a first layer and a second layer, the first layer switches coupled for data communications to data communications networks, the first layer switches also coupled to one another for link-level data communications by inter-switch links, each first layer switch also coupled for link-level data communications to each of the second layer switches, each second layer switch coupled for link-level data communications to at least one of the modular computer systems so that each second layer switch provides data communications connections to the switching apparatus only for service applications in the modular computer system to which a second layer switch is coupled;
all the switches stacked by a stacking protocol that shares administrative configuration information among the switches through the inter-switch links and presents all the switches in the switching apparatus to the networks and to the modular computer systems as a single logical switch;
the switching apparatus further comprises a plurality of data communications ports, at least one of the ports coupling the switching apparatus to at least one data communications network, at least one additional port connected to an applications running on at least one of the modular computer systems that carry out processing of data communications packets traveling from the networks, each application associated with a unique, link-level identifier; the switching apparatus further comprises rules governing the steering of data communications among service applications between networks connected to the switching apparatus and terminating applications connected to the switching apparatus, each rule comprising an association of an ingress port and a switch egress;
the computer program product comprising computer program instructions which, when executed by a data communications processor, cause the switching apparatus to carry out the steps of:
receiving, in the switching apparatus through an ingress port from a source network, data communications packets directed to a destination modular computer system, each such packet containing a source network address that identifies the source of the packet in the source network, each such packet also containing a destination network address that identifies a destination of the packet in the modular computer system;
steering by the switching apparatus each such packet among the service applications and toward the destination modular computer system, such steering carried out only in accordance with the rules, without using the link-level identifier of any service application, steering none of the packets directed to a destination modular computer system through any of the inter-switch links among the first layer switches;
steering, by the switching apparatus in the absence of a rule, each such packet through an egress port to the destination modular computer system using the link-level identifier of the terminal application without using any of the inter-switch links among the first layer switches;
receiving, in the switching apparatus through an ingress port from a modular computer system, data communications packets directed to a destination network, each such packet containing a source network address that identifies the source of the packet in the modular computer system, each such packet also containing a destination network address that identifies a destination of the packet in the destination network;
steering by the switching apparatus each such packet among the service applications and toward the destination network, such steering carried out only in accordance with the rules, without using the link-level identifier of any service application, steering none of the packets directed to a destination network through any of the inter-switch links among the first layer switches; and
steering, by the switching apparatus in the absence of a rule, each such packet through an egress port to the destination network using the link-level identifier of the network device and without using the inter-switch links among the first layer switches.

12. The computer program product of claim 11 wherein at least some of the first layer switches are incorporated in one or more link aggregation groups for data communications with the networks, each link aggregation group presenting to at least one of the networks multiple physical links as a single logical link.

13. The computer program product of claim 11 wherein:
the switching apparatus is configured, for at least some of the service applications, with two ports coupled to each such service application, one port for egress of packets from the switching apparatus to such service applications the packets directed toward a terminating application, and ingress of packets from the service application the packets directed toward a network: and another port for egress of packets from the switching system to such service application the packets directed toward a network, and ingress of packets from such service applications the packets directed toward a terminating application; and
steering each packet among the service applications further comprises steering each packet from the switching apparatus to such a service application through a separate egress port, each such service application carrying out its data processing related to each packet and then returning each packet to the switching apparatus through a separate ingress port.

14. The computer program product of claim 11 wherein:
the switching apparatus is configured, for at least some of the service applications, with only one port coupled to each such service application; and
steering each packet among the service applications further comprises steering each packet from the switching apparatus to such a service application through the one port coupling such a service application to the switching apparatus, each such service application carrying out its data processing related to each packet and then returning each packet to the switching apparatus through the one port.

15. The computer program product of claim 11 wherein steering each packet among the applications further comprises, upon receiving a packet through an ingress port from a source network or application in a modular computer system, selecting, in dependence upon the ingress port through which the packet was received, a rule that governs steering the packet to a switch egress.

* * * * *